(12) United States Patent
Brodt et al.

(10) Patent No.: US 10,671,642 B2
(45) Date of Patent: Jun. 2, 2020

(54) COPYING DATA CHANGES TO A TARGET DATABASE

(71) Applicant: International Business Machines Corporation, Armonk, NY (US)

(72) Inventors: Andreas Brodt, Gerlingen (DE); Bjoern Broll, Waldenbuch (DE); Daniel Martin, Stuttgart (DE); Jens P. Mueller, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 15/349,496

(22) Filed: Nov. 11, 2016

(65) Prior Publication Data

US 2018/0137186 A1    May 17, 2018

(51) Int. Cl.
| | | |
|---|---|---|
| *G06F 7/00* | (2006.01) | |
| *G06F 17/00* | (2019.01) | |
| *G06F 16/27* | (2019.01) | |
| *G06F 16/21* | (2019.01) | |
| *G06F 16/22* | (2019.01) | |
| *G06F 16/23* | (2019.01) | |

(52) U.S. Cl.
CPC .......... *G06F 16/275* (2019.01); *G06F 16/214* (2019.01); *G06F 16/2282* (2019.01); *G06F 16/2358* (2019.01)

(58) Field of Classification Search
CPC .. G06F 16/275; G06F 16/214; G06F 16/2282; G06F 16/2358; G06F 11/1474; G06F 2201/80
See application file for complete search history.

(56) References Cited

U.S. PATENT DOCUMENTS

| | | | |
|---|---|---|---|
| 7,949,640 B2 | 5/2011 | Holenstein et al. | |
| 7,974,943 B2 | 7/2011 | Gilbert et al. | |
| 8,983,919 B2 | 3/2015 | Gislason | |
| 9,152,659 B2 | 10/2015 | Cline et al. | |

(Continued)

OTHER PUBLICATIONS

IBM, "Moving Data Between Systems," https://www.columbia.edu/sec/acis/db2/db2d0/db2d054.htm, 2016, pp. 1-14.

(Continued)

*Primary Examiner* — Azam M Cheema
(74) *Attorney, Agent, or Firm* — Winstead PC

(57) ABSTRACT

A method, system and computer program product for copying data from a source database to a target database. A first database engine of the source database assigns a data-change-ID to each changed row in the source table. The data rows of the source table are stored in a plurality of source pages. Each source page comprises a source-page-ID and a highest-data-change-ID indicating its most recently changed data row. The target table comprises a source-page-ID-column. A second database engine of the target database maintains a metadata table comprising a source-page-ID column and a highest-data-change-ID column. The highest-data-change-IDs in the metadata table are compared with the highest-data-change-IDs of the source pages for selectively copying source table rows of source pages whose highest-data-change-ID is higher than their highest-data-change-ID in the metadata table to the target table.

20 Claims, 5 Drawing Sheets

(56) References Cited

U.S. PATENT DOCUMENTS

| | | | |
|---|---|---|---|
| 9,286,330 B2 | 3/2016 | Gau et al. | |
| 9,298,878 B2 | 3/2016 | Guirguis et al. | |
| 9,305,070 B2 | 4/2016 | Zhu et al. | |
| 9,542,468 B2 | 1/2017 | Itoh | |
| 2002/0174103 A1* | 11/2002 | Hsiao | G06F 16/10 |
| 2009/0285396 A1* | 11/2009 | Wong | G06F 16/214 |
| | | | 380/277 |
| 2010/0332526 A1 | 12/2010 | Nori et al. | |
| 2013/0173547 A1* | 7/2013 | Cline | G06F 11/1448 |
| | | | 707/638 |
| 2017/0177658 A1* | 6/2017 | Lee | G06F 11/1451 |

OTHER PUBLICATIONS

List of IBM Patents or Patent Applications Treated as Related, Dec. 14, 2017, pp. 1-2.

* cited by examiner

COPYING DATA CHANGES TO A TARGET DATABASE

TECHNICAL FIELD

The present invention relates generally to database management systems, and more particularly to copying of data changes from a source database table to a target database table.

BACKGROUND

Copying data from a source database to a target database is performed for many different purposes, e.g., for backup purposes, for load balancing purposes or for maintaining multiple copies of the same data on different engines for optimizing the organization of the data for different kinds of queries. One deployment strategy is to have a source database that is used for all update queries and then one or more target databases that receive full or incremental updates from the source database and are used in read-only mode to provide data to users and applications.

Multiple different approaches for copying data, in particular data changes, from a source database to another relational database (referred herein as "target database") exist.

One approach is directed to propagating a source data set to a plurality of target databases. However, the description of such an approach does not disclose the exact physical basis of the copying process.

Another approach is the so called "snapshot" technique: the object (e.g. a full table) is read from the source database and loaded (stored) into the target database. This snapshot must represent a consistent point in time of the source object. However, as soon as the source object is altered in the source database after the snapshot was taken, the source and the target object are inconsistent. To synchronize the objects in the source and the target database, it is common practice to incrementally apply changes that affect the source object to the target object using a replication mechanism.

However, executing incremental updates is not always an option, e.g., because the computational overhead for the incremental updates is considered too costly. If incremental updates are not an option, the entire source object must be copied to the target database based on a new snapshot. Such a reload may also be an expensive and time-consuming operation and typically involves the transfer of large amounts of data (which may actually have been replicated already).

Thus, many existing approaches for copying data from a source to a target database face several problems such as the computational overhead necessary for supporting incremental data replication, the large amount of data necessary for performing full snapshot replication operations and the problem of how to maintain data consistency of the replicated data changes as well as keeping the source and the target database in sync.

SUMMARY

In one embodiment of the present invention, a computer-implemented method for copying data from a source database maintained by a first database engine to a target database maintained by a second database engine comprises executing, by the first database engine, one or more transactions, thereby changing rows of a source table of the source database. The method further comprises assigning, by the first database engine, a data-change-ID to each changed row in the source table, the data-change-ID being indicative of the time of changing the row, all data-change-IDs assigned by the first database engine being ordered in a manner that reflects the sequence of commit events of the data changes. The method additionally comprises maintaining, by the first database engine, a plurality of source pages, where the data rows of the source table are stored, each source page having a source-page-ID and comprising an up-to-date highest-data-change-ID, the highest-data-change-ID being the data-change-ID having been assigned most recently to one of the data rows comprised in the source page. Furthermore, the method comprises creating, by the second database engine, a target table, the target table comprising a source-page-ID-column for storing, for each data row copied from the source table into the target table, the source-page-ID of the source page comprising the data row. Additionally, the method comprises maintaining, by the second database engine, a metadata table, the metadata table comprising a column for the source-page-IDs and a further column for the highest-data-change-IDs of the source pages identified by the source-page-IDs, the highest-data-change-IDs in the metadata table indicating the highest-data-change-IDs of the source pages at the time of previously copying rows of the source page to the target database. In addition, the method comprises copying data from the source table to the target table. The copying comprises comparing the highest-data-change-IDs in the metadata table with the highest-data-change-IDs of the source pages for identifying all source pages whose highest-data-change-ID is higher than their highest-data-change-ID in the metadata table. The copying further comprises selectively copying data contained in each of the identified source pages to the target table, thereby storing the source-page-ID of the source page in the source-page-ID-column of each source table row copied to the target table. The copying additionally comprises updating the metadata table such that the metadata table comprises an up-to-date association of the source-page-ID and the highest-data-change-ID of each copied source page.

Other forms of the embodiment of the method described above are in a system and in a computer program product.

In another embodiment of the present invention, a computer-implemented method for copying data from a source database maintained by a first database engine to a target database maintained by a second database engine comprises executing, by the first database engine, one or more transactions, thereby changing rows of a source table of the source database. The method further comprises assigning, by the first database engine, a data-change-ID to each changed row in the source table, the data-change-ID being indicative of the time of changing the row, all data-change-IDs assigned by the first engine being ordered in a manner that reflects the sequence of commit events of the data changes. The method additionally comprises creating, by the second database engine, the target table, the target table comprising a source-table-row-ID-column for storing, for each data row copied from the source table into the target table, the source-table-row-ID of the source table comprising the data row, the target table further comprising a data-change-ID-column for storing, for each data row copied from the source table into the target table, the data-change-ID assigned to the copied source table row by the first database engine. Furthermore, the method comprises copying data from the source table to the target table. The copying comprises comparing the data-change-ID assigned to each changed row in the source table with the data value stored in the data-change-ID-column of the corresponding row of the target table for identifying all source table rows whose assigned data-change-ID is higher than the data value stored in the data-change-ID-column of the corresponding row and for identifying all source table rows whose row-ID does not exist in the target table. The copying further comprises selectively copying data contained in each of the identified source table rows to the target table, thereby storing the row-ID and the data-change-ID of each identified source table row in the source-table-row-ID-column and the data-change-ID-column of the corresponding target table row.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
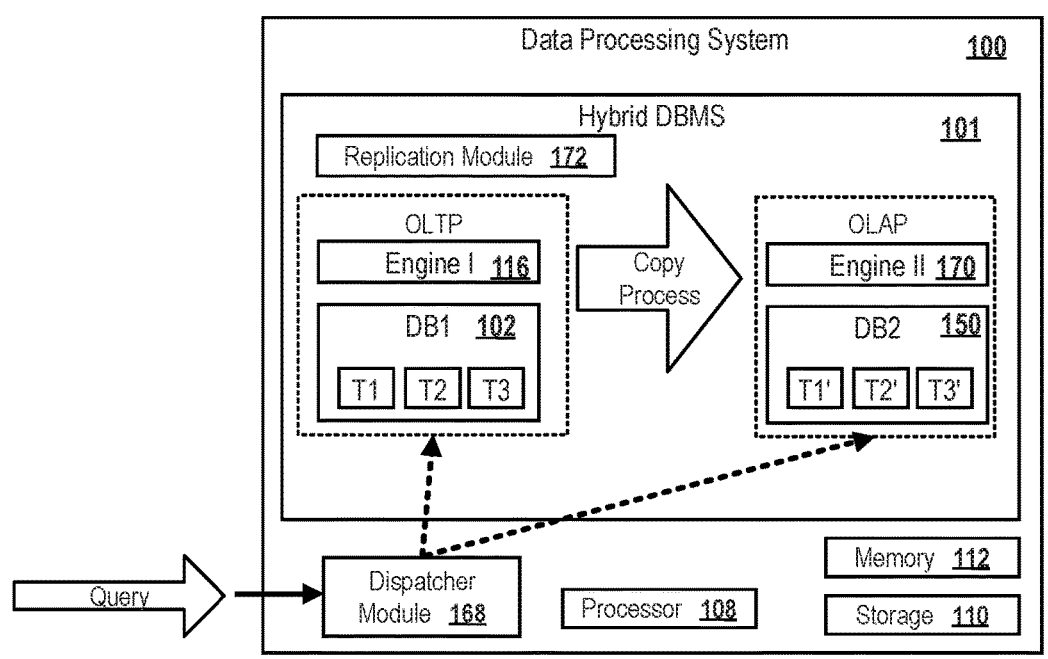
FIG. 1 depicts a block diagram of a data copying process in a hybrid DBMS according to an embodiment of the present invention.

Embodiments of the invention using a page-based data copying process may have the beneficial effect that a method for differentially copying (e.g., replicating) data from a source database to a target database is provided that requires reduced computational overhead for managing the copying process for synchronizing the content of the source and the target database. As the pages constitute the physical units of managing the data content of table rows, as each page typically comprises multiple rows and as the table rows stored in a page are stored contiguously on the same physical storage unit, performing the incremental copying on a per-page basis may increase the performance.

In a further advantageous aspect of the page-based differential copying process, the computational overhead for a copying process is reduced (e.g. compared to a row-based incremental copying process) as a page typically comprises multiple rows. Thus, less data objects to be copied need to be monitored.

In a further beneficial aspect, embodiments of the invention do not rely on information of a detailed log file maintained by the first database engine. Rather, metadata that is contained in the source pages anyway is used for determining if a particular row was changed and needs to be copied to the target table to keep the target table in sync with the source table. Said metadata relates to the data-change-ID of one of the source table rows contained in said source page and having been changed most recently by a transaction executed by the first database engine. Thus, it is not necessary to read and analyze large log files for determining if a particular source table row was modified after the last (incremental) copying process was performed or not. Rather, the necessary information on recent modifications can be read directly from the headers of the source table(s).

In still a further beneficial aspect of the page-based copying operation, the first engine locks only the source table rows contained in currently copied source tables. Thus, the majority of other source table rows remains unaffected by the copying process and can be accessed by concurrent transactions. This increases performance and avoids the delaying of concurrent transactions which would be the consequence of locking the whole source table.

In sum, the advantages of embodiments of the page-based copying method, system and computer program product may relate to an accelerated copying process, reduced lock times, and less CPU consumption.

Embodiments of the invention using a row based data copying process may have the beneficial effect that the copying process is performed on individual rows. Thus, the first engine locks or needs to lock only those source table rows which are currently read for copying them to the target table. Thus, the majority of other source table rows, including other rows in the same page, remains unaffected by the copying process and can be accessed by concurrent transactions. Instead of performing locking on the page level, individual rows are locked while their content is read for performing the incremental copying process. This minimizes the delaying of concurrent transactions by the locking of the source database or parts thereof during the data reading ("unloading") phase.

In a further advantageous aspect of the row-based incremental copying process, the second database engine does not need to maintain a metadata table in the target database. Instead, the target table is created such that it comprises two extra columns.

One extra column for storing the row ID of the row that was copied and stored to the target table. And a further extra column for storing the data-change-ID assigned to said copied source table row by the first database engine. For example, said data-change-ID can be the log record ID of the log record created upon modifying the row by the first engine. Before reloading the table, the contents of these two extra columns are sent to the source database. The first database engine analyzes the sent contents of said extra columns for identifying those rows of the source table that have changed since the point in time that is stored in the extra data-change-ID column (having e.g., the form of a log record ID column) of the target table. A row has changed if the data-change-ID assigned to said row (e.g., a log record ID that corresponds to a change of the row) in the source database is higher than the data-change-ID (e.g., log record ID) that is stored in the data-change-ID column (e.g., log record ID column) of the target table.

In contrast to the approach that performs locking on the page level, the advantage of this approach is that only modified rows are copied to the target database during a reload. However, to determine these rows, two values must be sent to the source database (row ID and log record ID) for each row in the target database.

According to some embodiments of the row-based and/or of the page-based copying method, the first database engine or the operating system of the computer system hosting the first database engine is configured for automatically keeping up-to-date a data-change-ID that indicates the time of the most recent change of one of the rows contained in said source page. For example, the storing and keeping up-to-date of the most recent data-change-ID of any one of the data rows contained in a source page may comprise storing the highest ID of the log record that corresponds to a change of one of the rows of the source page in the header of said source page.

According to embodiments, the first database engine is an online transaction processing (OLTP) engine. The second database engine can be, for example, an online analytical processing (OLAP) engine. Using the copying process according to embodiments of the invention for copying data from an OLTP database may be beneficial as OLTP databases are often heavily used by online processing of database transactions. The incremental copying process may allow to synchronize the target database management system (DBMS), e.g., an OLAP DBMS, with very little delay and computational overhead with the source DBMS so that read queries can be dispatched to the target database and can be executed there on a synchronized copy of the source database with only very little delay.

According to embodiments, the method comprises copying all data contained in the source table to the target table in an initial copying procedure; and incrementally replicating changes in the source table to the target table. The incremental replication is performed by repeatedly performing the copying of the data contained in all source pages comprising at least one row that has been changed since they were copied to the target table in a previous copying operation. Thus, a full copy of one or more source tables to respective target tables may be performed initially. Then, the incremental backup process as described herein for embodiments of the invention may be used for keeping the target database(s) in sync with the source database.

According to embodiments, the first database engine maintains a log. The log is indicative of when and in which table and table row a data change occurred in the source database, the log being free of the SQL statement that introduced the change. Embodiments of the invention may be advantageous as they read the relevant data-change-IDs from the metadata of the source pages, not from a log file. Thus, the incremental copying process described herein for embodiments of the invention also works in case the first database engine creates no log or creates only a log with reduced content, e.g., a log that lacks the complete SQL statements having introduced the change.

Some state of the art methods like the so-called "trickle feed" replication work by replicating the SQL statements recorded in the database log of the source database to the target database and re-executing them in the target database by the second database engine. To the contrary, embodiments of the invention do not require the log to comprise the full SQL statement(s) as the current invention is based on evaluating data-change-IDs in the form of the respective log sequence numbers (LSNs) of the performed database statements. The data is directly read from the source table(s) and respective data rows, not from a log, so the reading and parsing of a large log is not necessary. A key problem of log-based "trickle feed" replication is that non-logged changes cannot be replicated as log-based "trickle feed" replication only replays what the source database wrote to the database log. Thus, either a large log is generated that comprises enough details to support trickle-feed replication but that is typically very large and consumes much processing resources upon being parsed. Or a small log is generated that can be processed more easily but does not comprise sufficient details as to support trickle-feed replication operations. This problem may be overcome by embodiments of the invention as a replication mechanism is provided that does not need to access the log and may derive relevant information from database pages of the source table and a metadata table.

According to embodiments, the copying of the data from the source table to the target table comprises repeatedly executing a combined copying process. The combined copying process combines a log-based with a page-based data replication process as described herein for embodiments of the invention. In each repeat, at first the log-based copying process, e.g., a state of the art trickle-feed replication process, is executed. It comprises identifying all changes introduced to the source table that have been logged by analyzing the log. It further comprises extracting the SQL statements specifying the modifications from the log, and copying the modifications to respective rows of the target table by re-executing the extracted SQL statements by the second engine in the second database. After having executed the log-based data replication, e.g., by executing a conventional trickle-feed replication operation, a page-based data replication process as described herein for embodiments of the invention is executed for selectively replicating those changes which were not logged/specified in the log. As most changes are typically logged, the page-based replication and copying process typically does not find many pages to replicate. Nevertheless, if it finds a page that contains a non-logged change, it replicates it as described for embodiments of the invention.

According to embodiments, the comparison of the highest-data-change-IDs in the metadata table with the highest-data-change-IDs of the source pages comprises reading the highest-data-change-IDs to be compared directly from the source pages, not from a log maintained by the first database engine. This may increase performance as the reading and parsing of large log files for identifying current data-change-IDs (e.g., LSNs) is not necessary any more.

According to embodiments, each of the rows copied from the source table to the target table comprises the row-ID of said row. The row-ID of each row of the source table is a combination of the source-page-ID of the source page comprising said row and an offset of said row within the source page. For example, the row-ID of a row can be contained in the header of the copied row and the source-page-ID can be extracted from the row-ID and can be stored in the row-ID-column of the target table. Using the combination of the source-page-ID and the offset as the row-ID (RID) may be advantageous as said two values already exist and a combination of said two values is guaranteed to be unique. Thus, no additional computational effort for computing the RIDS is required.

According to embodiments, the copying of the data comprises locking each of the source pages individually while the data of said source page is copied to the target database. The data of a locked source page is inaccessible for concurrent transactions. This may be beneficial as the blocking of concurrent transactions by the first database engine while data is read from the source table(s) is reduced.

According to alternative embodiments, the entire source table is locked while reading data from some of the source pages for performing the incremental copying process. In this case, it is sufficient to store the highest data-change-ID (e.g., maximum log record ID) of all source pages that were copied to the target database. When performing a further incremental copying operation later for the source table, it would be required to read and copy only those pages of a source table whose log record ID stored in the page metadata are higher than the log record ID stored in the target database. However, this approach would not allow concurrent write access during the load process.

According to still alternative embodiments, instead of performing locking on the page level, it would also be possible to lock individual rows during the load process if the source database management system supports storing the highest ID of the log record that corresponds to a change of a row (see description of row-based copying process).

According to embodiments, the data-change-IDs are timestamps of a clock or log record sequence numbers.

According to embodiments, the keeping up-to-date of the highest-data-change-ID of each source table page is a built-in functionality of a DBMS comprising the first engine.

Many existing DBMSs already comprise a built-in functionality for storing and keeping up-to-date the highest-data-change-ID in the header of each source table page. This built-in functionality was originally designed and is used for supporting data recovery in case of a system failure, e.g. a power failure. Embodiments of the invention re-use said built-in functionality for a different purpose, i.e., an efficient incremental copying process. Reusing said built-in functionality may be advantageous as the incremental copying process may be implemented in any type of DBMS already comprising said functionality with comparatively few changes to the system.

According to embodiments, the second database engine, in response to having identified the source pages comprising at least one row that has been changed since they were copied to the target table in a previous copying operation, deletes all rows in the target table which comprise a source-page-ID of one of said identified source pages. Preferentially, the deletion is performed before the rows of the identified source pages are copied to and stored in the target database. For example, the deletion can be performed by executing the SQL command "DELETE from target_table WHERE source-page-ID IN (list of identified source-page-IDs)". Preferentially, the source-page-ID column of the target table comprises an index to support an efficient DELETE operation on selected rows. The deletion is performed before the data rows of the identified source page(s) are stored to the respective target table(s). Embodiments of the invention may be beneficial as the source-page-ID column does not only support an efficient incremental copying process, it in addition supports an efficient removal of outdated rows in the target table(s), thereby preventing the target table being cluttered up with redundant, outdated and inconsistent data.

Preferentially, the second database engine also in row-based replication scenarios deletes outdated rows from the target table before newer versions of said rows (comprising one or more recent data changes) are copied to and stored in the target database. The deletion may be performed, for example, as a logical delete followed later by a bulk physical delete operation.

According to embodiments, the selective copying of the data contained in each of the identified source pages to the target table comprises reading all data rows contained in each of the identified source pages, forwarding the read data rows to the target database, and storing the forwarded data rows in the target table in association with the page-ID of the source page from where each data row was read.

Reading data directly from the source pages of the source table, not from a log of the source database may be advantageous as the reading and parsing of large log files is computationally expensive and may be avoided. Moreover, in many systems the log file does not comprise sufficient information, e.g., the full SQL statements that introduced the changes, as to allow the replication of data changes to the target database based on the information of the log file alone.

According to embodiments, the first database engine belongs to a first DBMS. The second database engine belongs to a target DBMS. The method comprises:
 sending the metadata table maintained by the target DBMS to the source DBMS;
 performing, by the first database engine, the comparison of the highest-data-change-IDs in the metadata table with the highest-data-change-IDs of the source pages; and
 performing the selective copying of the data by copying the source table rows contained in each source table selectively in case the highest-data-change-ID of the source page comprising said row is higher than the highest-data-change-ID of said source-page in the sent metadata table.

According to embodiments, the copying method described herein for embodiments of the invention is performed as an incremental copying and/or replication approach after having initially copied one or more full source tables or partitions thereof to respective target tables of the target database.

According to embodiments, the source database is a row-oriented database and comprises multiple source tables. Each source page comprises one or more rows of one of the source tables. All data values within a source table row are stored in the same source page. Preferentially, each source page comprises a full row of a source table, i.e. all data values stored in one row of the source table.

According to embodiments, the source database is a column-oriented database. Each source page comprises one or more assignments of a column-value and one or more row-IDs being indicative of logical data rows comprising said column value. Each source page comprises an up-to-date highest-data-change-ID. The highest-data-change-ID is the data-change-ID having been assigned most recently to said column value upon an INSERT or UPDATE operation on a value in said column in one of the data rows assigned to said column value. The target table is created such that it comprises a row-ID column for storing the row-ID of a row of the source table and comprises, for each of the columns of the source table. The target table further comprises a source-page-ID-column for storing, for each column value of a table row copied from the source table into the target table, the source-page-ID of the source page comprising said column value.

The physical organization of the data in the target database is irrelevant here. Thus, if not explicitly stated otherwise, the description of the structure of the target database and the target tables given herein always refer to the logical organization of the data in the target database.

According to embodiments, the first and the second engines are both engines of the same DBMS. The DBMS can be a hybrid DBMS. According to one example, the source database is managed by DB2 for z/OS and the target database, also referred to as "accelerator database" is managed by the IBM DB2 Analytics Accelerator for z/OS.

However, OLTP and OLAP databases are only one possible implementation of a source and a target database being optimized for efficiently processing different kinds of database queries. According to other embodiments, the source database and the target database may be implemented in any possible combination of two different ones of the following database types:

- an OLAP database (i.e., a database suitable to handle complex data models for business management and statistics by supporting multidimensional queries that may allow consolidating data in real-time);
- an OLTP database (i.e., a database allowing updating existing transactional information to reflect gathered and processed information on all transactions having been performed in a transactional data processing system; OLTP databases ensure atomicity by efficient concurrency controls in order to guarantee that all the steps in a transaction are completed successfully as a group);
- a graph database (i.e., a database optimized for the storage and retrieval of data organized as a graph comprising nodes and edges),
- a triplestore (i.e., a database optimized for the storage and retrieval of subject-predicate-object triples),
- a key-value pair-based database (also referred to as "correlation database", i.e., a database designed to efficiently handle unplanned, ad hoc queries; it uses a value-based storage (VBS) architecture in which each unique data value is stored only once and an auto-generated indexing system allows efficient retrieval of all values);
- a document store (i.e., a database designed for storing and allowing efficient retrieval of document-oriented information, also known as semi-structured data and is typically implemented as NoSQL database);
- a row-oriented database (i.e., a database that stores data tables as sections of rows of data rather than as columns of data by serializing all of the values of a row together, then the values of the next row).
- a column-oriented database (i.e., a database that stores data tables as sections of columns of data rather than as rows of data by serializing all of the values of a column together, then the values of the next column).

Depending on the embodiment, the source database and the target database may be managed by the same DBMS supporting multiple types of queries or may be managed by two different DMBSs.

According to some embodiments using a copying process on a per-row basis, the method further comprises:

- maintaining, by the first database engine, a plurality of source pages wherein the data rows of the source table are stored, each source page having a source-page-ID and comprising an up-to-date highest-data-change-ID, the highest-data-change-ID being the data-change-ID having been assigned most recently to one of the data rows comprised in the source page;
- maintaining, by the second database engine, a metadata table, the metadata table comprising a column for the source-page-IDs and a further column for the highest-data-change-IDs of the source pages identified by said source-page-IDs, the highest-data-change-IDs in the metadata table indicating the highest-data-change-IDs of the source pages at the time of previously copying rows of said source page to the target database;
- the copying comprising:
  - comparing the highest-data-change-ID in the metadata table with the respective highest-data-change-IDs of the source pages for identifying all source pages whose highest-data-change-ID is higher than the highest-data-change-ID in the metadata table and for identifying source pages for which no entry exists in the metadata table, wherein the comparison of the data-change-ID assigned to each changed row in the source table with the data value stored in the data-change-ID-column of the corresponding row of the target table is performed selectively for source table rows contained in the identified source pages.

Said features may be advantageous as the above mentioned disadvantages of a log-based "trickle feed" replication may be overcome. Moreover, it is not necessary any more to evaluate and compare the data-change-IDs of all rows of the source table as only the data-change-IDs of source pages which comprise at least one changed and not yet replicated data row are analyzed. This may safe CPU power and accelerate the method.

A "database" as used herein is a collection of electronic information ("data") that is organized in memory or on a non-volatile storage volume in the form of a particular, defined data structure which supports or is optimized for data retrieval by a particular type of database query. The data is typically logically organized in database tables. A database can in particular be a relational database, e.g., a column-oriented database or a row-oriented database.

A "database management system (DBMS)" as used herein is a software application designed to allow the definition, creation, querying, update, and administration of databases. Examples for DBMSs are IBM DB2 for z/OS, MySQL, PostgreSQL and others.

An "engine" or "database engine" as used herein is the underlying software component that a database management system (DBMS) uses to create, read, update and delete (CRUD) data from a database. Most database management systems include their own application programming interface (API) that allows the user to interact with their underlying engine without going through the user interface of the DBMS.

A "page" or "database page" as used herein is the fundamental unit of data storage in a database. The disk space allocated to a physical storage unit, e.g., a data file (e.g., in the .mdf or .ndf format), in a database is logically divided into pages numbered contiguously from 0 to n. Disk I/O operations are performed at the page level. That is, a database engine reads or writes whole data pages upon performing an I/O operation. According to embodiments, each page is a fixed-length contiguous block of virtual memory, described by a single entry in the page table and it is also used by the operating system as the smallest unit of data for memory management in a virtual memory. Multiple physically contiguous pages can be grouped into "extents" which are used to efficiently manage the pages. The size of a page is typically in the range of several KBs. For example, a DBMS using pages of 8 KB will have to manage 128 pages per megabyte. According to embodiments, each page comprises a header and zero, one or more rows of a database table. The header is used to store system information about the page. This information comprises, for example, the page number, page type, the highest-data-change-ID (a data value that indicates a logical time of the most recent change introduced to one of the database rows contained in said page, e.g., a timestamp or log sequence number), the amount of free space on the page, and the allocation unit ID of the object that owns the page. A "source page" is a page that comprises rows of a "source" table, i.e. rows of a database table in a "source" database. A "source" database is a database used as data source for copying data from said source to a target database.

A "hybrid database management system (DBMS)" as used herein is a DBMS comprising at least a first database engine (or first "engine") and a second database engine ("second engine") whereby the first engine is configured to process a query received by the hybrid DBMS on instances of one or more database tables stored in a first database referred to as the "source database" and wherein the second engine is configured to process query received by the hybrid DBMS on instances of the one or more tables stored in a second database (referred herein as target database). The first and the second engine may be speed-optimized for different types of queries and/or data formats. The first and second engines can be installed and run on the same hardware system and can be configured for exchanging data via a system bus. Alternatively, the first and second engine can be hosted on different computers configured for exchanging data via a network connection. In a hybrid DBMS, at least some of the data of the first database is replicated to the second database, therefore the data of at least some tables is available to both engines, but stored in different formats. Thus, every engine owns a copy of some data in its own format that is optimized for the specific workload. The formats differ, for example, in compression, row-oriented vs. column-oriented storage, etc. A hybrid DBMS may comprise a single interface and "hide" the existence of two different engines from the client as the hybrid DBMS may automatically decide which one of its engines is to be used for executing a query received from a client.

A "database query" or "query" as used herein is a command to retrieve data from a DBMS, the command being specified in the syntax of the interface of the DBMS.

A "transaction" as used herein is a database query that comprises one or more database statements and that is processed according to the ACID (atomicity, consistency, isolation, durability) principles.

A "lock" as used herein is a mechanism of a DBMS for enforcing limits on access to a resource in a database where there are many threads of execution. A lock is designed to enforce a defined concurrency control policy. Within a database, locks can be granted over a database or over different database resources, e.g., tables, partitions, segments, blocks and rows. Locks can be of different types. Some non-limiting examples are read locks (when a resource is read, a read lock may be used to prevent an update of the resource data while the resource data is being retrieved), write locks (when a resource is updated, a write lock may be used to prevent processes relating to other commands from reading or updating the resource data at the same time; when a new resource is added, a write lock may be used to prevent processes of other commands from adding or using the same resource at the same time), etc.

A "database log" or "log" as used herein is a data object, e.g., a text file, that contains a history of significant database events and optionally also parameter settings. The log file may include, for example, startup parameter settings, the date and time of startup and shutdown, system error messages and an indication when and where changes were introduced in a database. In some cases, also the content of the amendment (e.g., the full INSERT, UPDATE or DELETE statement that introduced the amendment) is contained in the log. Logs are used, for example, to trace events preceding database crashes.

An "assignment" as used herein is a physical representation of a logical mapping of two objects. For example, an assignment can be represented in the form of a file or a database table wherein IDs of objects to be assigned are stored in the same row.

A "data change-ID" as used herein is a data value that is indicative of a logical time or a clock time of introducing a change (UPDATE, INSERT, DELETE) to a data row or an individual data value in a row of a table. All data-change-IDs are maintained by the first engine and are assigned to respective rows or data values in accordance with the chronological sequence of said rows or values being changed. Each data-change-ID is unique within the first database. According to some examples, the data-change-ID can be a log record ID generated in ascending order and being assigned to respective log entries. The log record ID may be specified, e.g., by the relative byte address (RBA) or the log record sequence number (LRSN) in DB2 for z/OS. Said log record numbers (RBA, LRSN, etc.) can be used as the data change IDs as they are indicative of the moment in time when a particular table row or row value was amended. Alternatively, a timestamp generated or managed by a clock of the first database engine may be used as the data-change-ID.

A "row-oriented" database as used herein is a database that stores data tables as sections of rows of data rather than as columns of data by serializing all of the values of a row together, then the values of the next row.

A "column-oriented" database as used herein is a database that stores data tables as sections of columns of data rather than as rows of data by serializing all of the values of a column together, then the values of the next column.

Figure 4:
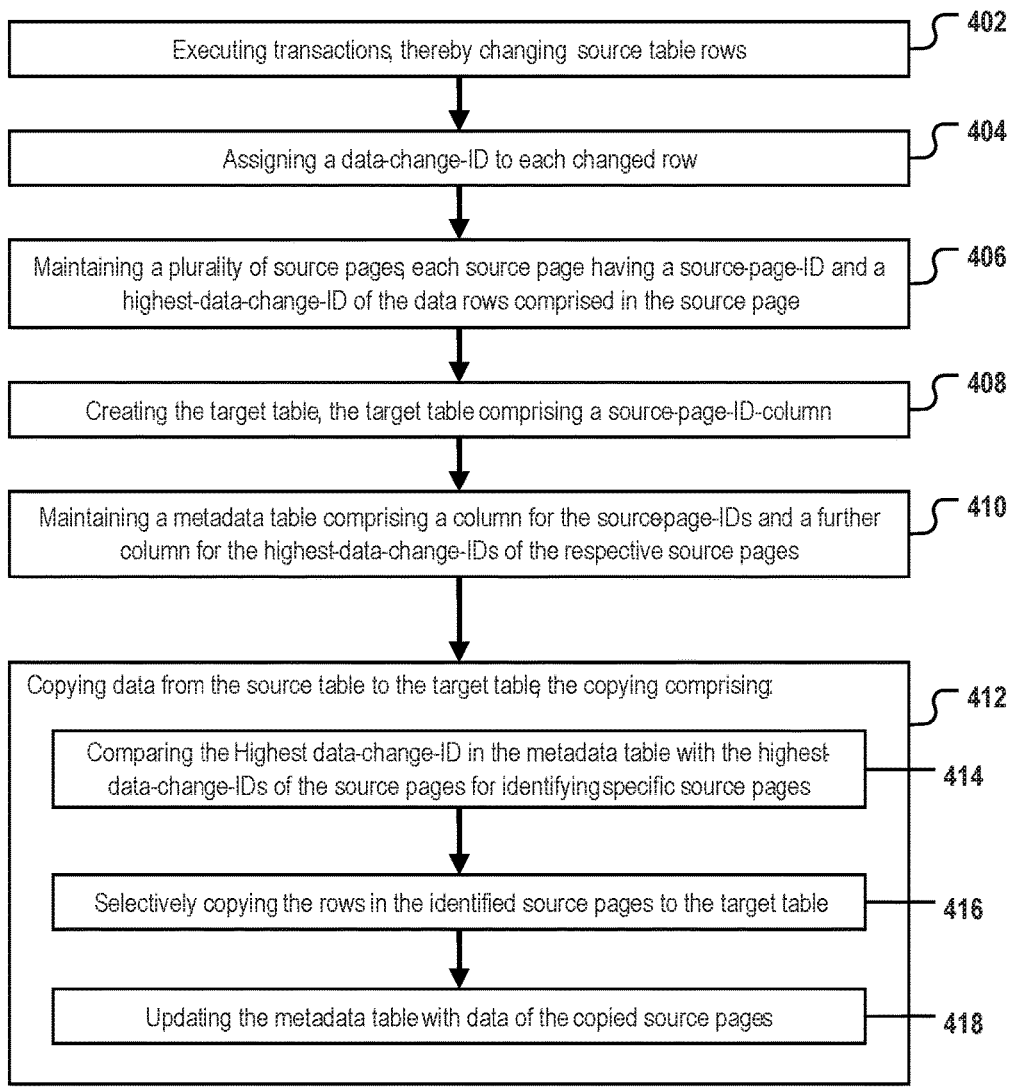
FIG. 4 depicts a flowchart of a method according to according to one embodiment of the present invention.

Referring now to the Figures in detail, FIG. 1 depicts a block diagram of a data copying process in a hybrid DBMS according to an embodiment of the present invention. The copying process may be performed, for example, according to a method depicted in FIG. 4. In the following, the method of FIG. 4 will be described by making reference to the elements of FIG. 1.

FIG. 1 shows a data processing system 100 comprising one or more processors 108, a main memory 112 and a non-volatile storage device 110. The data processing system can be, for example, a database server connected to the Internet, a desktop computer or any other form of data processing device. The data processing system hosts the first database engine 116 and a second database engine 170. The first database engine is configured to execute database queries on database tables T1, T2, T3 of a first database 102. The second database engine 170 is configured to execute database queries on database tables T1', T2', T3' of a second database 150. One or more tables of the first database act as source tables: data changes in the source tables are copied in an incremental copying (replication) process to respective target tables of the target database.

According to the depicted embodiment, the first and the second database engines are contained in the same DBMS 101 which is referred herein as "hybrid DBMS". A dispatcher module 168 is configured for receiving database queries from a client application, analyze the received queries and dispatch at least some of them for execution by the second engine on the data content of the second database.

For example, in case the dispatcher module determines that the received query is of a query type that can be executed quicker on the target database than on the source database, the dispatcher module may dispatch the received database query for execution to the second database engine. According to one example, the first database can be an OLTP database and the first engine can be optimized for quickly performing OLTP queries on the tables of the first database while the second database can be an OLAP database and the second engine can be optimized for quickly performing OLAP queries on the tables of the second database.

However, the data processing system can also be a distributed system wherein the first engine is part of a first DBMS and is hosted by a first computer system, the second database engine is part of a second DBMS and is hosted by a second computer system and wherein the first and the second computer systems are connected to each other via a network, e.g., the Internet. The first and/or second database engine can be optimized for different types of queries than depicted in FIG. 1. In still other embodiments, there exists one source DBMS maintaining a source database and a plurality of target DBMS respectively maintaining a target database, whereby each of the target databases is synchronized incrementally with the source database by using the copying method described herein. The DBMS of the source and/or the target database is preferentially a relational DBMS.

The data processing system 100 and the hybrid DBMS 101 stored therein is adapted for performing a computer-implemented method for copying data from the source database 102 maintained by the first database engine 116 to the target database 150 maintained by the second database engine 170. In one or more first steps 402, the first database engine 116 performs one or more database transactions, e.g., INSERT, UPDATE and/or DELETE SQL operations.

Thereby, the first engine changes one or more rows of a source table T1 of the source database 102. Of course, more than one table may be affected by the changes in the source database. For the sake of simplicity, the following description of the method will focus on changes introduced to the source table T1 which are copied to the respective target table T1'. The described technical principles likewise apply to pairs of source and target tables comprising T1 and T1'.

In step 404, the first database engine assigns a data-change-ID to each row in the source table T1 that was changed by the one or more transactions. The data-change-ID is a data value that is indicative of the time of changing said row. All data-change-IDs assigned by the first engine are ordered in a manner that reflects the sequence of commit events of the data changes. For example, a data-change-ID can be a timestamp that is chronologically ordered in accordance with a clock of the first database engine. Alternatively, the data-change-ID can be a log record sequence number assigned by the first database engine to a modified table row upon storing a log entry being descriptive of the changes introduced to that row. Still alternatively, the data-change-ID can be any data value that monotonously increases with time and allows identifying at least the relative chronological sequence of the data changes imposed on rows of tables of the source database. According to some examples, the assignment of the data-change-IDs to the changed rows of the source table can be stored e.g. in the form of a value in an additional data-change-ID column in the source table and/or in a complete log or an information-reduced log maintained by the first database engine.

Figure 2A:
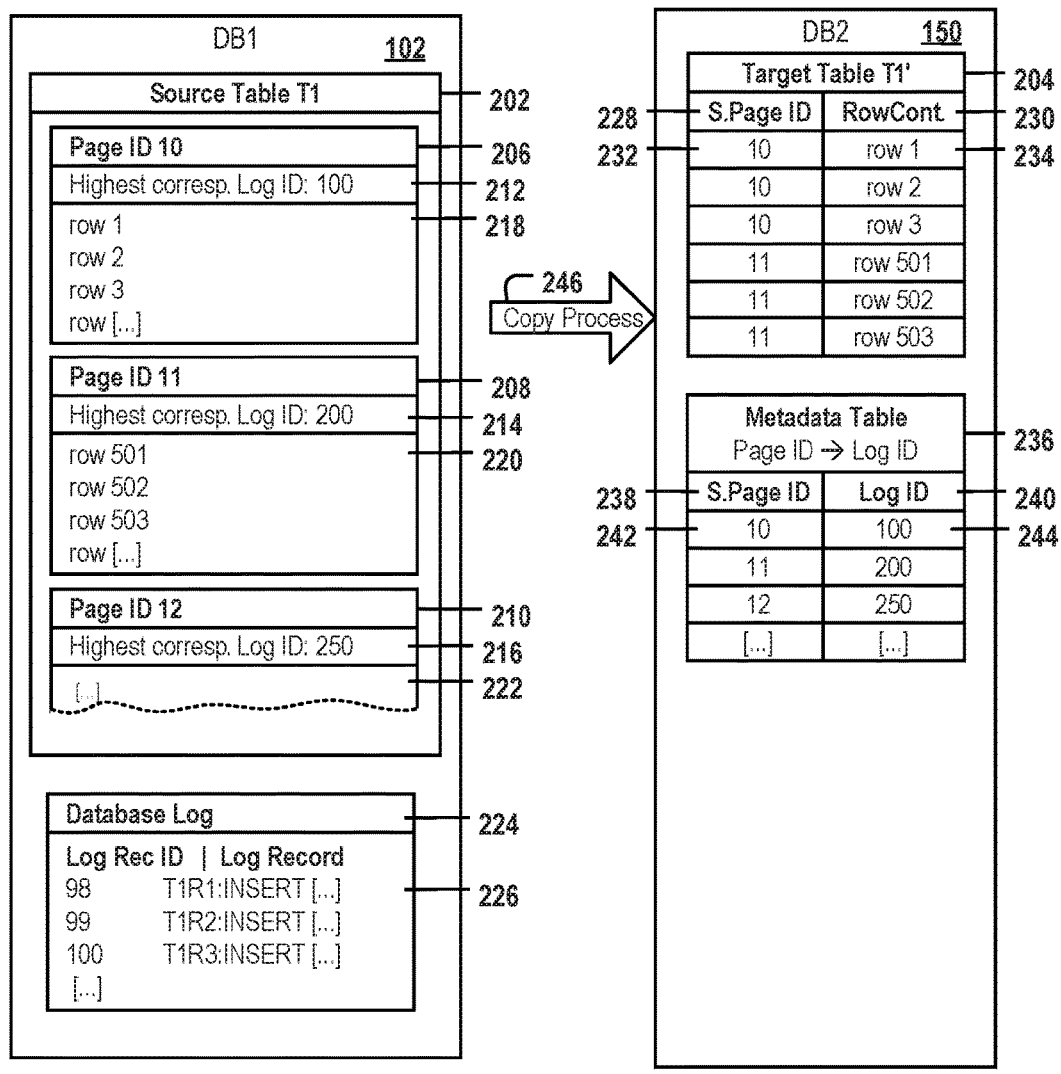
FIG. 2A depicts source tables of a row-based source database and respective target tables in a target database according to one embodiment of the present invention.

The first database engine maintains, according to step 406, a plurality of source pages wherein the data rows of the source table T1 are stored (see FIG. 2A). Each source page has a source-page-ID and comprises an up-to-date highest-data-change-ID. The highest-data-change-ID is the data-change-ID having been assigned most recently to one of the data rows comprised in the source page.

Relational database systems usually store rows of a table within organizational structures that are called "data pages" or "pages". Each row thereby usually has a unique record identifier (also referred to as "row-ID" or "RID"). A RID can consist of a page number and an offset within the page that specifies the storage location of said row in said page.

When a row is changed in a source table T1, the first database engine according to some example implementation variants records every change on the row level in a database log. Every log record is identified by an ID numbered in ascending order (e.g., by the relative byte address (RBA) or the log record sequence number (LRSN) in DB2 for z/OS). Said log record numbers (RBA, LRSN, etc.) can be used as the data change IDs as they are indicative of the moment in time when a particular table row or row value was amended.

If data of a row stored in a particular page are changed (e.g., due to INSERT, UPDATE, or DELETE operations), the RBA or LRSN that represents the time of the most recently performed change of any of the rows contained in said particular page is usually stored in the header (metadata) of said data page.

In step 408, the second database engine creates the target table T1'. The target table comprises a source-page-ID-column. Said column is used for storing, for each data row copied from the source table into the target table, the source-page-ID of the source page comprising said data row.

In addition, according to step 410, the second database engine maintains a metadata table. The metadata table comprises a column for the source-page-IDs and a further column for the highest-data-change-IDs of the source page identified by said source-page-ID. In step 412, the data processing system 100 copies data from the source table to the target table.

In a sub step 414, the data processing system 100 compares the highest-data-change-IDs in the metadata table with the highest-data-change-IDs of the source pages. The respective source page can be identified by the source-page-ID column of the metadata table. The comparison comprises identifying all source pages whose highest-data-change-ID is higher (i.e., corresponds to a later change) than their respective highest-data-change-ID in the metadata table (i.e., identifying all source pages comprising at least one row that has been changed since the moment in time when the most recent previous copying process to the target table was performed). Thus, all source pages comprising at least one row that has been changed since they were copied to the target table in a previous copying operation are identified.

In step 416, the data rows which are contained in all the identified source pages are selectively copied to the target table. Thereby, the source-page-ID of the source page from which a data row was read is stored in the source-page-ID-column of the target table to which said row is copied.

Preferentially, when reading data of a table from a source database for copying it to the target database, each source page is locked when it is accessed until all rows of the source page have been read completely. Each row having been completely read from a source page typically contains the RID of said row in its header. Embodiments of the invention exploit this mechanism and also the automated keeping up-to-date of the highest data-change-ID in the metadata of each source page to differentially unload and copy only those parts of a source table in a relational database that were altered after the last snapshot was taken. Said data is read and copied into a target database by comparing data page metadata with corresponding metadata stored in a metadata table maintained by the target database, whereby the metadata table was updated upon completion of the previous copying operation.

After having copied and stored the rows of each of the identified source pages in the target table, the metadata table is updated in step 418 such that the metadata table comprises an up-to-date association of the source-page-ID and the highest-data-change-ID of each of the identified and copied source pages. The updating ensures that the next incremental copying process will affect only data in those pages comprising a row which was amended after the reading of the data for the current incremental copying process was completed.

FIG. 2A depicts a source table T1 202 of a row-oriented source database 102 and a respective target table T1' according to one embodiment of the present invention in detail. The rows of a table of a row-oriented database are organized in a similar way like the row-based logical structure of the respective tables T1.

The rows of the source table T1 are stored in multiple pages, e.g., a first source page 206, a second source page 208, a third source page 210 and optionally several further source pages.

The first source page 206 has assigned the page ID="10" and comprising multiple rows 218, e.g. "row 1", "row 2", "row 3", etc. The header of said page comprises a highest-data-change-ID 212, i.e., the data-change-ID assigned to one of the rows 218 contained in said page which has been changed most recently. In the depicted example, the data-change-IDs are implemented as log-IDs. The highest-data-change-ID of page 206 is "100". The expression "row 1" may represent a row of one or more attribute values, whereby the number of attribute values depends on the number of columns of the source table. Typically, each row in a page comprises the complete row of a database table row.

The second source page 208 has assigned the page ID="11" and comprising multiple rows 220, e.g. "row 501", "row 502", "row 503", etc. The header of said page comprises a highest-data-change-ID 214, i.e., the data-change-ID assigned to one of the rows 220 contained in said page which has been changed most recently. The highest-data-change-ID of page 208 is "200".

The third source page 210 has assigned the page ID="12" and comprising multiple rows 226. The header of said page comprises a highest-data-change-ID 216, i.e., the data-change-ID assigned to one of the rows 222 contained in said page which has been changed most recently. The highest-data-change-ID of page 208 is "250".

The source database further comprises a database log 224 comprising multiple log records 226. The log 224 is maintained by the first database engine 116. It comprises a history of all UPDATE, DELETE and INSERT statements executed by the first engine on one or more source table rows of the source database. Each log row comprises an indication of the SQL statement having introduced the change ("INSERT . . . ") and an indication of the table row or individual column value affected by said SQL statement ("T1R1" for "row 1 of source table T1", "T2R1" for "row 2 of source table T1", etc.). In addition, each row of the log in the depicted example comprises a data-change-ID (here: a log record sequence number or "log-ID") being indicative of the chronological order of creating the log records and respective changes. The DBMS or the operating system of the computer hosting the DBMS automatically ensure that the highest-data-change-ID of the pages 202, 208, 210 is automatically updated. For example, the log records 226 indicate that row 3 of table T1 was modified more recently (at a data-change-ID/log-ID of "100") than row 2 of table T1 (which was modified at a log-ID of "99"). Accordingly, the highest-data-change-ID of page 206 comprising row 2 and row 3 of T1 is "100".

The target table T1' of the target database is created such that it comprises all columns of the respective source table T1 (referred herein as "row content" 230) and in addition a source-page-ID column 228. For example, in case the source table T1 comprises columns C1, C2 and C3, the target table T1' is created such that it comprises the columns C C2' and T1' (here summarized as "RowCont.") and the source-page-ID column. When the rows of a particular page 206 are copied from the source table T1 to the target table T1', at first all outdated rows in the target table are deleted by performing a command like "DELETE from table T1' WHERE Source_Page_ID='10'. Then, all table rows 218 contained in the identified source page 206 are stored in the target table T1'. Thereby, for each copied row of source table 206, the column values in the source table rows are stored in respective columns 230 in the target table and the page ID "10" of the source table 10 is stored in the source-table-page-ID column 228 of the target table. The page-based incremental copying is performed for each source page comprising changes which have not yet been replicated to the target database, e.g., for page 206 having a page ID="10" and for page 208 having a page ID="11".

The identification of the source pages comprising changes which have not yet been replicated to the target database is performed by comparing data-change-IDs stored in a data-change-ID column 240 of a metadata table 236 maintained by the target database and the highest-data-change-IDs 212, 214, 216 of all source pages of the source database. In case it is determined that a source page comprises a highest-data-change-ID that has a higher value/is indicative of a more recent change than the data-change-ID stored in association with source-page-ID 238 in the metadata table, said source page is identified as a source page that comprises new, non-replicated data and that needs to be copied to a respective target table.

In the depicted example, the metadata table stores the log record IDs (RBA or LRSN) of the source data pages at the time when their respective data content was read completely during the previous full or incremental copying process. As soon as the reading of data from a page of a source table for performing a full or incremental copying process is started, said page is locked. The data-change-ID that is stored in the page metadata of said is stored in the metadata table 236 in a respective column 240 when the storing of the copied rows of said source page has completed. The source page 206, 208, 210 is immediately unlocked after all its rows were read. Preferentially, the data-change-IDs of the source tables are kept up-to-date by the first engine or the operating system of a computer hosting the first engine while the data-change-IDs in the corresponding column 240 of the metadata table are kept up-to-date by the second database engine responsible for storing the copied rows in the target database.

Preferentially, the comparison of the data-change-IDs in the metadata table 236 and the highest-data-change-IDs 212, 214, 216 of the source pages is performed by the second engine. Thus, the content of the metadata table 236 is sent to the source database for enabling the first engine to perform the comparison for identifying those pages that have changed since the respective point in time that is stored in the metadata table in the data-change-ID-column 240. A page has changed if its highest-data-change-ID 212, 214, 216 is higher than the data-change-ID value 240 stored in the metadata table 236 in association 238 with the source-page-ID 206, 208, 210 of said page.

Figure 2B:
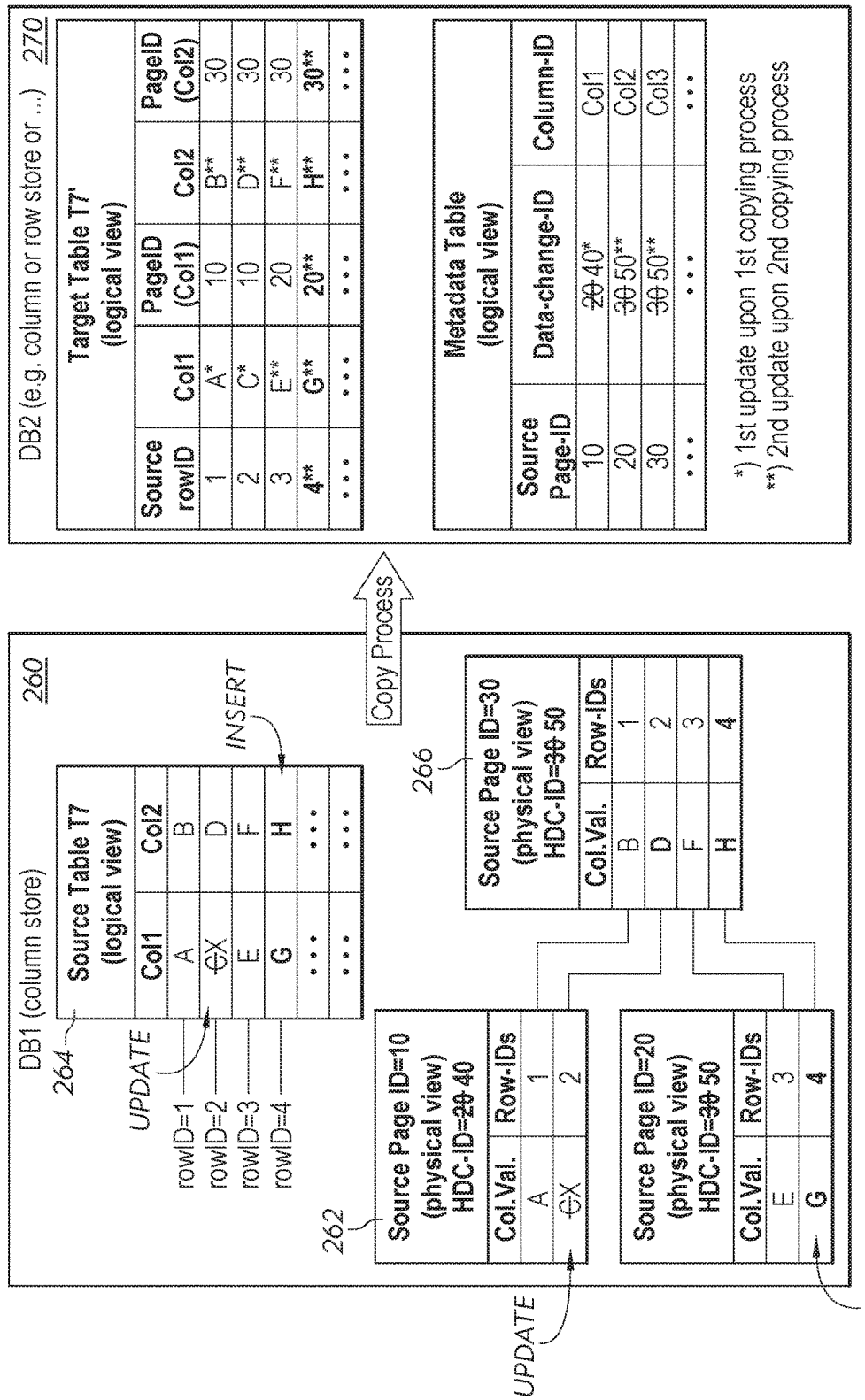
FIG. 2B depicts source tables of a column-based source database and respective target tables in a target database according to one embodiment of the present invention.

FIG. 2B depicts a logical view of a source table T7 stored in a column-oriented source database 260, multiple source pages comprising the data of the source table T7 and the logical structure of a respective target table T7' in a target database according to one embodiment of the present invention. The physical organization of the target database and the target table T7' is irrelevant in this context so only the logical view of the target table T7' is depicted.

In a column-oriented database, the logical organization of a table significantly differs from the physical organization of its data. According to the logical view of the source table T7, said table comprises a first column Col1 and a second column Col2.

In a column-oriented database, the pages do not comprise all attribute values of a logical row of a table. Rather, each page comprises pairs of a column value (e.g., "A" of a particular column, e.g., "Col1", and the row-ID of the row comprising said column value "A"). For example, the data of source table T7 is stored in the source pages 262, 164 and 266 as follows: the values A and C of the Col1 column are stored in source page 262. The values E and G of the Col1 column are stored in source page 264. So both pages 262 and 264 store column values of the Col1 column. In addition, page 266 stores column values of column Col2 and assigns them to their respective row-ID. In case the source table T7 comprises n columns, the target table T7' comprises 2n+1 columns: for each column of the source table, there exists a respective source-page-ID-column ("PageID(Col1)", "PageID(Col2)"). In addition, the target table comprises a further column for the row-IDs.

Each source page comprises a highest-data-change-ID ("HDC-ID") that is automatically kept up-to-date as described for the row-based database of FIG. 2A.

In case a change occurs in one of the source pages 262, all column values in the target table having been read and copied from said source page need to be deleted in the target table and replaced by the copied column values.

Example

At a first time log-ID=20, the first column col1 of the source table comprises the data values A, C and E and the second column comprises the data values B, D and F. The target table T7' is in sync with the source table T7 and comprises all column values and the corresponding page-IDs:

| SourceRowID | Col1 | PageID(col1) | Col2 | PageID(col2) |
|---|---|---|---|---|
| 1 | A | 10 | B | 30 |
| 2 | C | 10 | D | 30 |
| 3 | E | 20 | F | 0 |

The content of the metadata table is:

| SourcePage-ID | Data-Change-ID | Column-ID |
|---|---|---|
| 10 | 20 | Col1 |
| 20 | 30 | Col1 |
| 30 | 30 | Col2 |

At a second time log-ID=40, the first engine performs an UPDATE command that replaces the value "C" by value "X" in column Col1 that is physically stored in page 262. As a consequence, the highest-data-change-ID of page 262 is automatically updated from "20" to "40". In a subsequent incremental copying process, the DBMS determines that the page 262 comprises a change that was not yet replicated to the target database. As a consequence, all data values contained in the target table T7' that have been copied previously from page 262 are deleted. Thus, the values "A" and "C" in the target table T7' are deleted as they stem from page 262. Then, all column values of the source table stored in page 262 are copied to and stored in the respective column of the target database. The content of the target table T7' and of the metadata table after the content of page 262 was copied is given below. The new column values "A" and "X" are highlighted. In FIG. 2B, the amendments introduced by said first copying process are labeled with "*".

| SourceRowID | Col1 | PageID(col1) | Col2 | PageID(col2) |
|---|---|---|---|---|
| 1 | A | 10 | B | 30 |
| 2 | X | 10 | D | 30 |
| 3 | E | 20 | F | 30 |

The content of the metadata table is:

| SourcePage-ID | Data-Change-ID | Column-ID |
|---|---|---|
| 10 | 40 | Col1 |
| 20 | 30 | Col1 |
| 30 | 30 | Col2 |

At a third time log-ID=50, the first engine performs an INSERT command that inserts the value "G" in column Col1 that is physically stored in page 264 and that inserts the value "H" in column Col2 that is physically stored in page 266. As a consequence, the highest-data-change-ID of page 264 is automatically updated from "30" to "50" and the highest-data-change-ID of page 266 is automatically updated from "30" to "50". In a subsequent incremental copying process, the DBMS determines that the pages 264 and 266 respectively comprise a change that was not yet replicated to the target database. As a consequence, all data values contained in the target table T7' that have been copied previously from pages 264 and 266 are deleted. Thus, the values "E", "B", "D" and "F" in the target table T7' are deleted as they stem from pages 264 and 266. Then, all column values of the source table stored in pages 264 and 266 are copied to and stored in the respective column of the target database in a second copying process. The content of the target table T7' and of the metadata table after the content of page 262 was copied is given below. The new column values which now also comprise the inserted values "G" and "H" are highlighted. In FIG. 2B, the amendments introduced by said first copying process are labeled with "**".

| SourceRowID | Col1 | PageID(col1) | Col2 | PageID(col2) |
|---|---|---|---|---|
| 1 | A | 10 | B | 30 |
| 2 | X | 10 | D | 30 |
| 3 | E | 20 | F | 30 |
| 4 | G | 20 | H | 30 |

The content of the metadata table is:

| SourcePage-ID | Data-Change-ID | Column-ID |
|---|---|---|
| 10 | 40 | Col1 |
| 20 | 50 | Col1 |
| 30 | 50 | Col2 |

Figure 3:
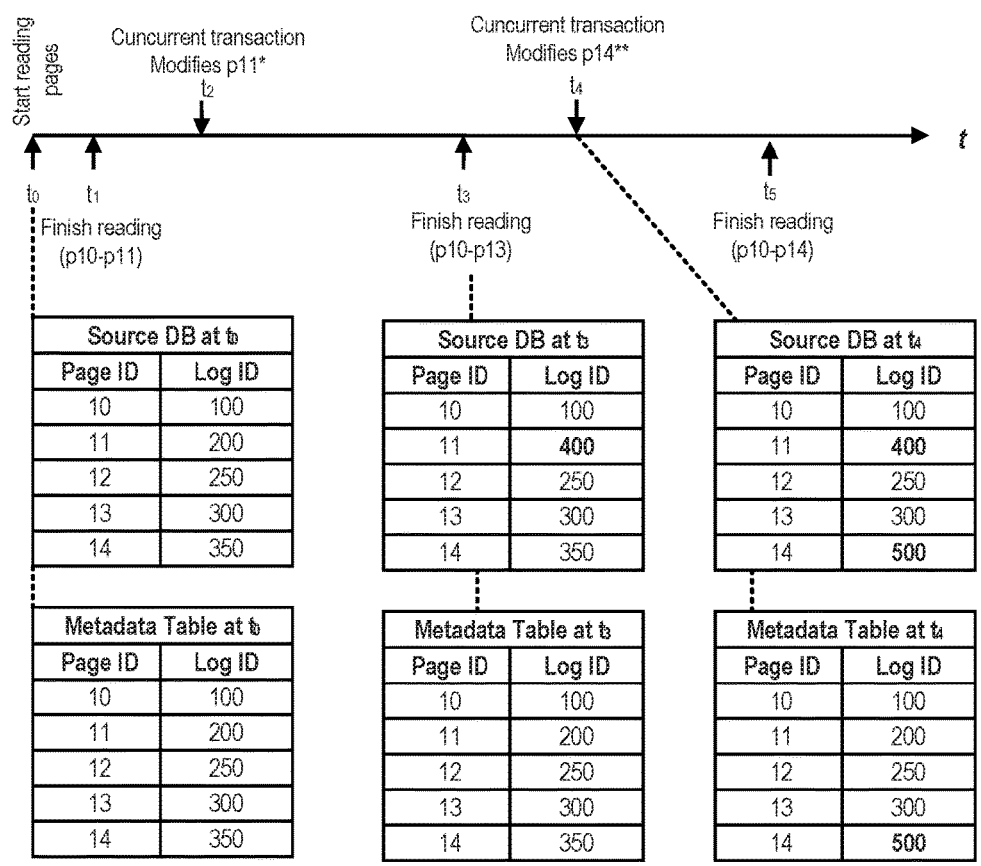
FIG. 3 depicts assignments of page-IDs and data-change-IDs in the source database as well as the content of the metadata table maintained by the second database at different times according to one embodiment of the present invention.

FIG. 3 depicts assignments of page-IDs and data-change-IDs in the source database as well as the content of the metadata table maintained by the second database at different times according to one embodiment of the present invention. In this example, a small source table that consists of five pages having page-IDs 10, 11, 12, 13 and 14 is copied to a target database. The read process to read the data from the source table starts at time t0. Only the page that is currently read is locked. At time t1, the read process finishes reading pages 10 and 11. At time t2, a transaction modifies page 11, which was already read. Said modification will thus not be copied to the target table in the current copying process. At time t3, the read process finishes reading pages 12 and 13. At time t4, a concurrent transaction modifies page 14, which was not yet read. At time t5, the read process finishes reading page 14 and terminates. When the read data is copied to the target table, the modifications in page 11 are copied to the target database. The tables below the timeline show the data-change-IDs (here: log record IDs) that are stored in the source database in association with respective page-IDs (e.g., in the header of the respective pages) and in addition shows the content of the metadata table of the target database at the respective times t0, t3, and t4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for copying data from a source database maintained by a first database engine to a target database maintained by a second database engine, the computer program product comprising a non-transitory computer readable storage medium having program code embodied therewith, the program code comprising the programming instructions for:
    executing, by the first database engine, one or more transactions, thereby changing rows of a source table of the source database;
    assigning, by the first database engine, a data-change-ID to each changed row in the source table, the data-change-ID being indicative of the time of changing said row, all data-change-IDs assigned by the first database engine being ordered in a manner that reflects a sequence of commit events of the data changes;
    maintaining, by the first database engine, a plurality of source pages, wherein data rows of the source table are stored, each source page having a source-page-ID and comprising an up-to-date highest-data-change-ID, the highest-data-change-ID being the data-change-ID having been assigned most recently to one of the data rows comprised in the source page;
    creating, by the second database engine, a target table, the target table comprising a source-page-ID-column for storing, for each data row copied from the source table into the target table, the source-page-ID of the source page comprising said data row;
    maintaining, by the second database engine, a metadata table, the metadata table comprising a column for the source-page-IDs and a further column for the highest-data-change-IDs of the source pages identified by said source-page-IDs, the highest-data-change-IDs in the metadata table indicating the highest-data-change-IDs of the source pages at the time of previously copying rows of said source page to the target database; and
    copying data from the source table to the target table, the copying comprising: comparing the highest-data-change-IDs in the metadata table with the highest-data-change-IDs of the source pages for identifying all source pages whose highest-data-change-ID is higher than their highest-data-change-ID in the metadata table;
    selectively copying data contained in each of the identified source pages to the target table, thereby storing the source-page-ID of said source page in the source-page-ID-column of each source table row copied to said target table; and
    updating the metadata table such that the metadata table comprises an up-to-date association of the source-page-ID and the highest-data-change-ID of each copied source page.

2. The computer program product of claim 1, wherein the program code further comprises the programming instructions for:
    in an initial copying procedure, copying all data contained in the source table to the target table; and
    incrementally replicating changes in the source table to the target table by repeatedly performing the copying of the data contained in all source pages comprising at least one row that has been changed since they were copied to the target table in a previous copying operation.

3. The computer program product of claim 1, the copying of the data comprising locking each of the source pages individually while the data of said source page is copied to the target database, the data of a locked source page being inaccessible for the transactions.

4. The computer program product of claim 1, wherein the program code further comprises the programming instructions for:
    in response to having identified the source pages comprising at least one row that has been changed since they were copied to the target table in a previous copying operation, deleting, by the second database engine, all rows in the target table which comprise a source-page-ID of one of said identified source pages.

5. The computer program product as recited in claim 1, wherein the first database engine is an OLTP engine.

6. The computer program product as recited in claim 1, wherein the first database engine maintains a log, the log being indicative of when and in which table and table row a data change occurred in the source database, the log being free of the SQL statement that introduced the change.

7. The computer program product as recited in claim 1, wherein the comparison of the highest-data-change-IDs in the metadata table with the highest-data-change-IDs of the source pages comprises:
    reading the highest-data-change-IDs to be compared directly from the source pages, not from a log maintained by the first database engine.

8. The computer program product as recited in claim 1, wherein each of the rows copied from the source table to the target table comprises the row-ID of said row, the row-ID of each row of the source table being a combination of the source-page-ID of the source page comprising said row and an offset of said row within the source page.

9. The computer program product as recited in claim 1, wherein the data-change-IDs are timestamps of a clock or log record sequence numbers.

10. The computer program product as recited in claim 1, wherein a keeping of the highest-data-change-ID of each source table page up-to-date is a built-in functionality of a DBMS comprising the first database engine.

11. A system, comprising:
   a memory unit for storing a computer program for copying data from a source database maintained by a first database engine to a target database maintained by a second database engine; and
   a processor coupled to the memory unit, wherein the processor is configured to execute the program instructions of the computer program comprising:
      executing, by the first database engine, one or more transactions, thereby changing rows of a source table of the source database;
      assigning, by the first database engine, a data-change-ID to each changed row in the source table, the data-change-ID being indicative of the time of changing said row, all data-change-IDs assigned by the first database engine being ordered in a manner that reflects a sequence of commit events of the data changes;
      maintaining, by the first database engine, a plurality of source pages, wherein data rows of the source table are stored, each source page having a source-page-ID and comprising an up-to-date highest-data-change-ID, the highest-data-change-ID being the data-change-ID having been assigned most recently to one of the data rows comprised in the source page;
      creating, by the second database engine, a target table, the target table comprising a source-page-ID-column for storing, for each data row copied from the source table into the target table, the source-page-ID of the source page comprising said data row;
      maintaining, by the second database engine, a metadata table, the metadata table comprising a column for the source-page-IDs and a further column for the highest-data-change-IDs of the source pages identified by said source-page-IDs, the highest-data-change-IDs in the metadata table indicating the highest-data-change-IDs of the source pages at the time of previously copying rows of said source page to the target database; and
      copying data from the source table to the target table, the copying comprising:
         comparing the highest-data-change-IDs in the metadata table with the highest-data-change-IDs of the source pages for identifying all source pages whose highest-data-change-ID is higher than their highest-data-change-ID in the metadata table;
         selectively copying data contained in each of the identified source pages to the target table, thereby storing the source-page-ID of said source page in the source-page-ID-column of each source table row copied to said target table; and
         updating the metadata table such that the metadata table comprises an up-to-date association of the source-page-ID and the highest-data-change-ID of each copied source page.

12. The system as recited in claim 11, wherein the first database engine is an OLTP engine.

13. The system as recited in claim 11, wherein the program instructions of the computer program further comprise:
   in an initial copying procedure, copying all data contained in the source table to the target table; and
   incrementally replicating changes in the source table to the target table by repeatedly performing the copying of the data contained in all source pages comprising at least one row that has been changed since they were copied to the target table in a previous copying operation.

14. The system as recited in claim 11, wherein the first database engine maintains a log, the log being indicative of when and in which table and table row a data change occurred in the source database, the log being free of the SQL statement that introduced the change.

15. The system as recited in claim 11, wherein the comparison of the highest-data-change-IDs in the metadata table with the highest-data-change-IDs of the source pages comprises:
   reading the highest-data-change-IDs to be compared directly from the source pages, not from a log maintained by the first database engine.

16. The system as recited in claim 11, wherein each of the rows copied from the source table to the target table comprises the row-ID of said row, the row-ID of each row of the source table being a combination of the source-page-ID of the source page comprising said row and an offset of said row within the source page.

17. The system as recited in claim 11, wherein the copying of the data comprises:
   locking each of the source pages individually while the data of said source page is copied to the target database, the data of a locked source page being inaccessible for the transactions.

18. The system as recited in claim 11, wherein the data-change-IDs are timestamps of a clock or log record sequence numbers.

19. The system as recited in claim 11, wherein a keeping of the highest-data-change-ID of each source table page up-to-date is a built-in functionality of a DBMS comprising the first database engine.

20. The system as recited in claim 11, wherein the program instructions of the computer program further comprise:
   in response to having identified the source pages comprising at least one row that has been changed since they were copied to the target table in a previous copying operation, deleting, by the second database engine, all rows in the target table which comprise a source-page-ID of one of said identified source pages.

* * * * *